United States Patent [19]

Ng

[11] 4,266,143
[45] May 5, 1981

[54] APPARATUS FOR PRODUCING ELECTRICAL ENERGY FROM OCEAN WAVES

[76] Inventor: Ting F. Ng, 29 Ludlow St., New York, N.Y. 10002

[21] Appl. No.: 76,903

[22] Filed: Sep. 19, 1979

[51] Int. Cl.³ .............................................. F03B 13/12
[52] U.S. Cl. ....................................... 290/53; 290/42; 417/332; 60/505
[58] Field of Search ....................... 290/42, 53; 416/84, 416/85; 417/100; 60/398, 500, 499, 505, 506, 507; 9/8; 115/4, 5

[56] References Cited

U.S. PATENT DOCUMENTS

| | | | |
|---|---|---|---|
| 3,204,110 | 8/1965 | Masuda | 290/53 |
| 3,231,749 | 4/1963 | Hinck | 290/53 |
| 3,774,048 | 11/1973 | Hardingham | 290/42 |
| 4,196,591 | 4/1980 | Wallace | 60/497 |

Primary Examiner—J. V. Truhe
Assistant Examiner—D. L. Rebsch

[57] ABSTRACT

An energy conversion device is disclosed which utilizes the natural movements of ocean waves to produce electrical energy. The apparatus is contained in a tank which is adapted to float near the surface of the water and tilt from side to side about a pivot point located below the tank, thereby simulating a pendulum-like movement. A sinker weight is employed to produce the appropriate movement of the tank and maintain the floating tank in balance at the ocean surface. The pendulum motion of the tank is used to roll a plurality of gravity wheels or their respective horizontal platforms in the tank in such manner that shafts associated with the gravity wheels are caused to rotate. Electrical generators are operatively connected to the rotating shafts for producing electrical energy from the mechanical rotative energy of the shafts as the tank tilts from side to side with the wave motion. Each gravity wheel is equipped with a ratchet-like lock which prevents backward motion of the wheel such that it rolls in a single direction in a circular path on the platform. While one or more gravity wheels have their locks set so the wheels roll only in a clockwise direction, other gravity wheels are free to roll only in a counterclockwise direction. In this fashion, when the tank tilts to one side due to the rise of an ocean wave the gravity wheels roll from the higher side of their respective platforms to the lower sides along their prescribed circular paths. The centrifugal force generated by the weight of the gravity wheels and the unceasing action of the ocean waves provides the continuous generation of electrical energy.

5 Claims, 6 Drawing Figures

APPARATUS FOR PRODUCING ELECTRICAL ENERGY FROM OCEAN WAVES

BACKGROUND OF THE INVENTION

The present invention relates to energy conversion systems, and more particularly to the production of electrical energy from the natural movement of ocean waves.

DESCRIPTION OF THE PRIOR ART

The oil crisis and gasoline shortages occurring in recent years demonstrate the importance of developing new and better methods of producing energy. One source of energy which is of significant interest is ocean wave energy due to the wide geographical availability of the seas and the unlimited potential energy of wave motion.

In the past, research performed on ocean thermodynamics revealed that energy costs would surpass energy production for the then known ocean wave producing energy systems. In one known system, a floating tank is provided with an opening at the top of the tank which leads into a passage extending through the center of the tank where a propeller-like blade is mounted. The action of the ocean waves causes water to flow into the opening at the top of the tank where such water falls onto the blade to rotate it and consequently produce electrical energy. One limitation of this system is that it can utilize only the amount of ocean water that flows into the tank opening to provide the dynamic force on the propeller blade, rather than being able to use the full force of the ocean wave.

It is an object of the present invention to provide an energy conversion apparatus which utilizes the natural movements of ocean waves to produce electrical energy. It is another object to provide an energy conversion apparatus which is simple to manufacture but yet produces a large amount of energy from the ocean waves. It is another object to provide an energy conversion apparatus which utilizes both the rising cycle of the ocean wave as well as the subsiding cycle of such ocean wave. It is a further object to provide an energy conversion apparatus which operates off the major forces of the ocean wave.

SUMMARY OF THE INVENTION

These and other objects are achieved by the present invention which provides energy conversion apparatus which utilizes the natural movements of ocean waves to produce electrical energy. The apparatus is contained in a tank which is adapted to float near the surface of the water and tilt from side to side about a pivot point located below the tank, thereby simulating a pendulum-like movement. A sinker weight is employed to produce the appropriate movement of the tank and maintain the floating tank in balance at the ocean surface. The pendulum motion of the tank is used to roll a plurality of gravity wheels on their respective horizontal platforms in the tank in such manner that shafts associated with the gravity wheels are caused to rotate. Electrical generators are operatively connected to the rotating shafts for producing electrical energy from the mechanical rotative energy of the shafts as the tank tilts from side to side with the wave motion.

Each gravity wheel is equipped with a ratchet-like lock which prevents backward motion of the wheel such that it rolls in a single direction in a circular path on the platform. While one or more gravity wheels have their locks set so the wheels roll only in a clockwise direction, other gravity wheels are free to roll only in a counterclockwise direction. In this fashion, when the tank tilts to one side due to the rise of an ocean wave the gravity wheels roll from the higher side of their respective platforms to the lower sides along their prescribed circular paths. Similarly, when the ocean wave subsides, the tank will tilt in the opposite direction toward the other side to cause gravity wheels to continue their rolling movement on their respective platforms.

Each tank may, for example, contain six gravity wheels or some other even number arranged one above the other in a stacked fashion. Half of the gravity wheels are set to roll in a clockwise direction. A pivot bar is rigidly connected to extend vertically from the bottom of the tank. The bottom of the pivot bar is connected to a sinker weight at a joint which forms the pivot point for the tank.

A stabilizing cable is connected between ocean towers and connects to the pivot point joint so as to maintain a location for the tank and prevent too much drift thereof. The stabilizing cable is also used to hold the electrical wires of the electrical generators in the tank. Also, the cable may connect to a plurality of tanks operating at many locations in the ocean.

DESCRIPTION OF THE PREFERRED EMBODIMENTS

Figure 1:
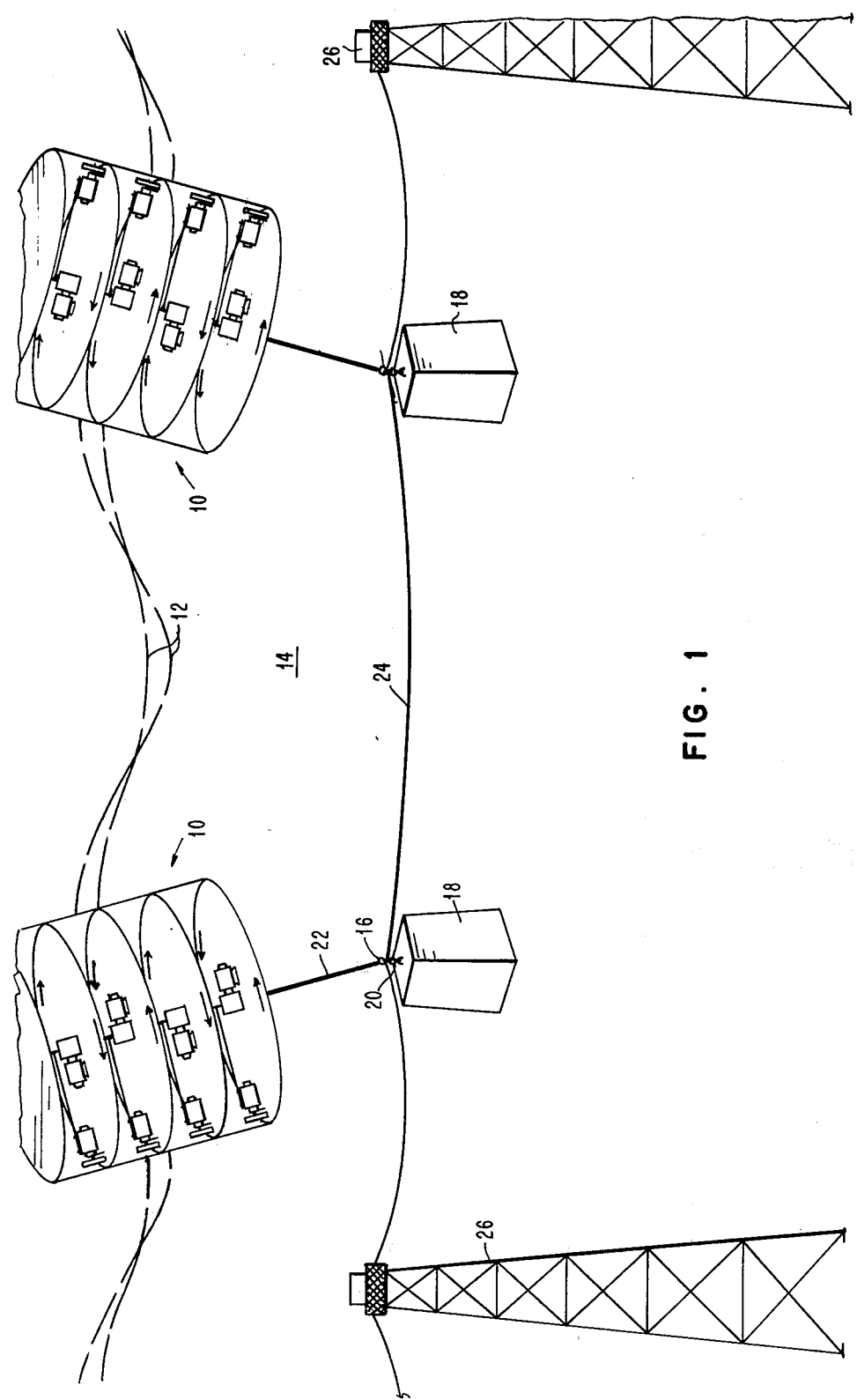
FIG. 1 is a schematic diagram of two tanks floating on the ocean and containing the energy conversion apparatus, illustrative of the present invention.

Referring to FIG. 1, there is shown a schematic diagram of two essentially identical tanks 10 floating near the surface 12 of the water 14 and containing the energy converting apparatus therein, the tanks 10 tilt from side to side about a pivot point 16 located below the tank, thereby simulating a pendulum-like movement. A sinker weight 18 is employed to produce the appropriate movement of the tank 10 and maintain the floating tank 10 in balance at the ocean surface. The weight 18 is connected to the tank 10 by means of a chain or closed metal loops 20 attached at one end to the weight 18 and at the other end to a pivot bar 22. Pivot bar 22 is rigidly attached, at its upper end, to the bottom of the tank 10 and extends downward therefrom. The chain 20 constitutes a flexible joint and acts as a relatively stationary pivot point for the tank 10. A stabilizing cable 24 is connected between ocean towers 26 and connects to the pivot point chain 20 so as to stabilize the location of the tank 10 and prevent too much drift thereof. The stabilizing cable 24 is also used to hold the electrical wires of the electrical generators in the tank 10, as will be described hereinbelow. Also, the cable 24 may connect to a plurality of tanks 10 operating at many locations in the ocean.

Figure 2B:
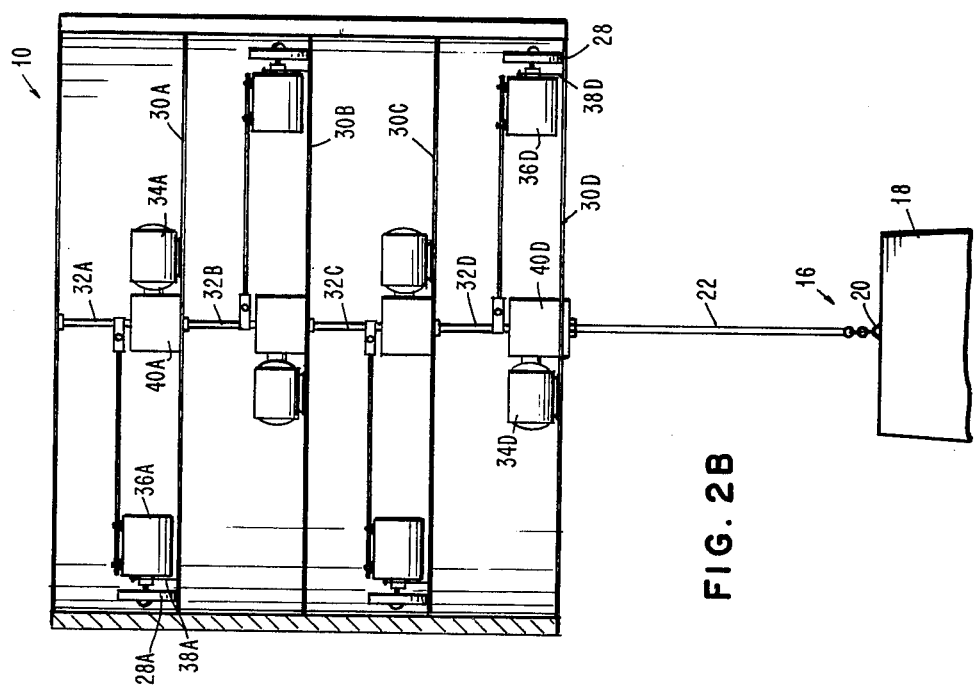
FIG. 2B is a side view of the apparatus of FIG. 2A.
Figure 2A:
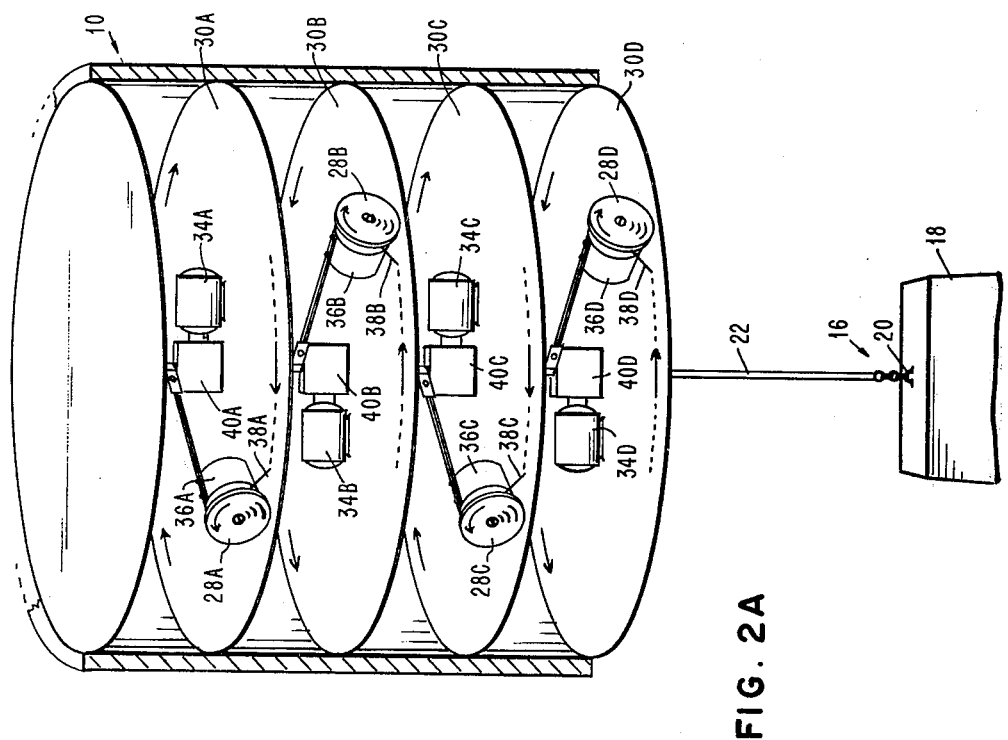
FIG. 2A is a perspective, partially broken away view of one embodiment of the energy convering apparatus contained within a tank, including four gravity wheels for operating their four associated electric generators.

Referring to FIGS. 2A and 2B, the pendulum motion of the tank 10 used to roll a plurality of gravity wheels 28A, B, C and D on their respective horizontal platforms 30A, B, C and D in the tank in such manner that shafts 32A, B, C and D associated with the gravity wheels are caused to rotate. Electrical generator 34A, B, C and D are operatively connected to the rotating shafts 32A, B, C and D for producing electrical energy from the mechanical rotative energy of the shafts 32A, B, C and D as the tank tilts from side to side with the wave motion. Gravity weights 36A, B, C and D are attached to and coaxial with each respective gravity wheel 28A, B, C and D. Each gravity wheel is equipped with a ratchet-like lock 38A, B, C and D which prevents backward motion of the wheel such that it rolls in a single direction in a circular path on the platform. In the arrangement shown in FIG. 2A, gravity wheels 28A and 28C have their locks 38A and 38C set so the wheels roll only in a clockwise direction, while gravity wheels 28B and 28D are free to roll only in a counterclockwise direction.

Gear boxes 40A, B, C and D are connected to respective shafts 32A, B, C and D and serve to convert the shaft rotation to a higher speed drive for the generators 34A, B, C and D connected to said gear boxes at another end.

In operation, when the tank 10 tilts to one side due to the rise of an ocean wave, the gravity wheels roll from the higher side of their respective platforms to the lower sides along their prescribed circular paths. Similarly, when the ocean wave subsides, the tank 10 will tilt in the opposite direction toward the other side to cause the gravity wheels to continue their rolling movement on their respective platforms.

Each tank may, for example, contain six gravity wheels or some other even number arranged one above the other in a stacked fashion. Half of the gravity wheels are set to roll in a clockwise direction while the remaining half are set to roll rotating shafts 32A, B, C and D for producing electrical energy from the mechanical rotative energy of the shafts 32A, B, C and D as the tank tilts from side to side with the wave motion. Gravity weights 36A, B, C and D are attached to and coaxial with each respective gravity wheel 28A, B, C and D. Each gravity wheel is equipped with a ratchet-like lock 38A, B, C and D which prevents backward motion of the wheel such that it rolls in a single direction in a circular path on the platform. In the arrangement shown in FIG. 2A, gravity wheels 28A and 28C have their locks 38A and 38C set so the wheels roll only in a clockwise direction, while gravity wheels 28B and 28D are free to roll only in a counterclockwise direction.

Gear boxes 40A, B, C and D are connected to respective shafts 32A, B, C and D and serve to convert the shaft rotation to a higher speed drive for the generators 34A, B, C and D connected to said gear boxes at another end.

In operation, when the tank 10 tilts to one side due to the rise of an ocean wave, the gravity wheels roll from the higher side of their respective platforms to the lower sides along their prescribed circular paths. Similarly, when the ocean wave subsides, the tank 10 will tilt in the opposite direction toward the other side to cause the gravity wheels to continue their rolling movement on their respective platforms.

Figure 3:
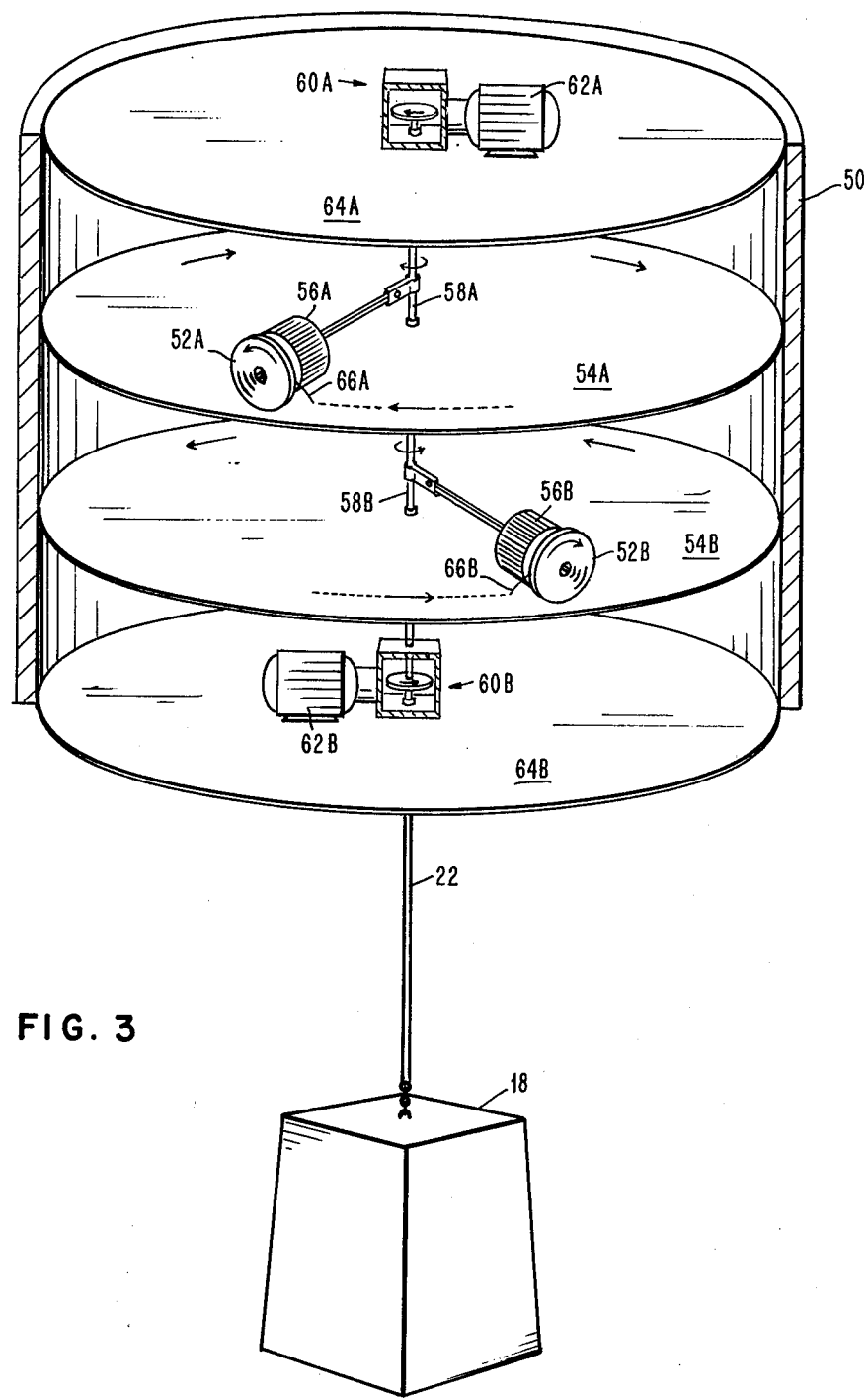
FIG. 3 is a perspective, partially broken away view of another embodiment wherein two gravity wheels are employed.

Each tank may, for example, contain six gravity wheels or some other even number arranged one above the other in a stacked fashion. Half of the gravity wheels are set to roll in a clockwise direction while the remaining half are set to roll in a counterclockwise direction. In the embodiment shown in FIG. 3, a tank 50 contains two gravity wheels 52A and B which roll on respective platforms 54A and B. Gravity wheels 52A and B are operatively connected via weights 56A and B, shafts 58A and B, and gear boxes 60A and B to electrical generators 62A and B in a manner similar to the essentially identical parts shown and described with reference to FIGS. 2A and 2B. In this embodiment only two generators are used, and these generators 62A and B are mounted on platforms 64A and B both above and below their respective gravity wheels 52A and 52B. Also, gravity wheel 52A is set by a lock 66A to roll in a clockwise direction, while the gravity wheel 52B is set by a lock 66B to roll in a counterclockwise direction. Locks 66A and B can be a pawl and ratchet, while the weights 56A and B provide flywheel-like operation.

Figure 4:
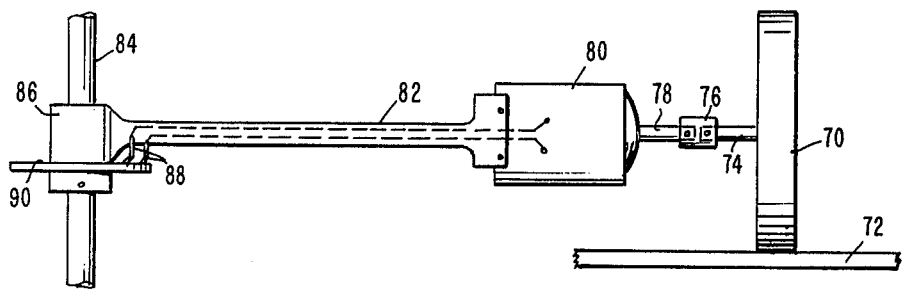
FIG. 4 is a schematic, taken from a side view, of an alternate embodiment of an electrical generator and its connection to its associated gravity wheel.

Referring to FIG. 4, there is shown a schematic of the side view of an alternate embodiment of an electrical generator and its connection to its associated gravity wheel. Here, a gravity wheel 70 rolls on a horizontal platform 72 in the same manner as the gravity wheels described above, except that the gravity wheel 70 has its axis 74 directly coupled by a connector 76 of an electrical generator 80. In this fashion, the generator 80 is powered directly by the mechanical rotative power of the gravity wheel. The generator 80 is connected by a bar 82 to a fixed vertical support 84. Bar 82 has a bearing 86 at its end such that the bar 82 rotates in almost friction-free manner about the support 84. The generator wires 88 are brought through the bar 82 and attached to electrical connectors 90 such as rotor brushes for tapping off the electrical current at the support 84. While a direct coupling 76 is shown, it is to be understood that various conventional gear mechanisms, not shown, can be employed in order to produce the rotative speed (r.p.m.) needed for generating electricity from the rotation of the gravity wheel 70. Also, a gravity wheel having a relatively smaller diameter than that shown in the Figure could be used to produce a higher r.p.m.

Figure 5:
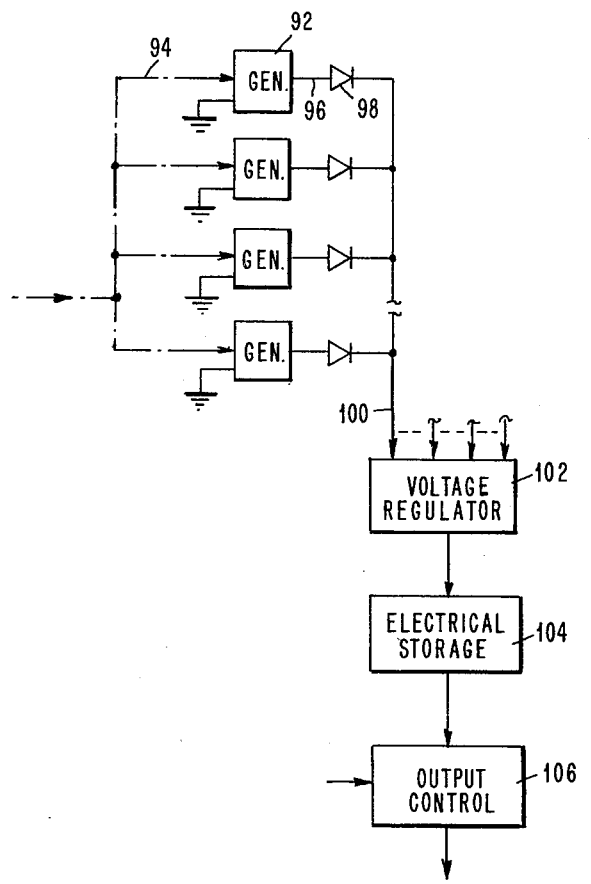
FIG. 5 shows one electrical circuit for receiving and storing the electrical power generated by the apparatus of the present invention.

Referring to FIG. 5, the electrical circuit includes a plurality of generators 92 similar to those described above, each generator receiving mechanical rotative power from its own shaft 94 and providing electrical power at its output 96. The four generators 96 shown are contained in a single tank while several tanks are similarly connected in the circuit. Rectifiers or diodes 98 protect the generators 92 from receiving current from one another. The output of the generators 92 is provided on several lines 100 to a voltage regulator 102 which regulates the voltage being outputted to an electrical storage device 104. Device 104 is a conventional electrical storage means, such as a bank of capacitors that is charged as current is generated, and discharged either on demand or in some predetermined fashion, such as when a prescribed charging voltage is reached. For this purpose, an output control 106 is employed. Since the design of an electrical storage and an output control are not the objects of the present invention, it should be understood that conventional devices within the skill of the art are employed.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. Apparatus for producing electrical energy from ocean waves, comprising
   (a) a tank adapted for floating on ocean waves;
   (b) an even number of generating sections in said tank, each including a first rotatable shaft extending above a first horizontal platform, a first gravity wheel attached to said first rotatable shaft by means of a coupling member such that said wheel rolls on said first horizontal platform in a circular path around said shaft thereby driving said first rotatable shaft, said gravity wheels in one half of said generating sections being adapted to roll only clockwise while the other gravity wheels in the other half of the generating sections are adapted to roll in only a counterclockwise direction, and first generator means operatively connected to said first rotatable shaft for receiving mechanical energy therefrom; and
   (c) stabilizing means attached to the bottom of said tank for limiting the lateral movement of the bottom end of said tank; said stabilizing means including a pivot bar rigidly attached at its upper end to the bottom of said tank, the bottom of said pivot bar being connected by a flexible joint to a weight means so that said tank tilts from side to side about a pivot point at said flexible joint;

whereby as said floating tank tilts from side to side about a pivot point located below said tank, said gravity wheels will roll and cause rotation of said rotatable shafts and thereby generate electrical energy.

2. Apparatus as recited in claim 1, further comprising a gravity weight mounted coaxial with each said gravity wheel.

3. Apparatus as recited in claim 1, wherein each of said generating sections is located vertically in stacked arrangement above the other.

4. Apparatus as recited in claim 1, further comprising electrical energy storage means connected to the output of each generator means for storing the electrical output therefrom, and means for controlling the output of said electrical energy storage means.

5. Apparatus as recited in claim 4, further comprising rectifier means connected to the output of each generator means to protect each said generator means from receiving electrical current from each other.

* * * * *